T. R. HANSON.
DIRIGIBLE HEADLIGHT.
APPLICATION FILED JAN. 4, 1915.
1,158,207.
Patented Oct. 26, 1915.
2 SHEETS—SHEET 2.
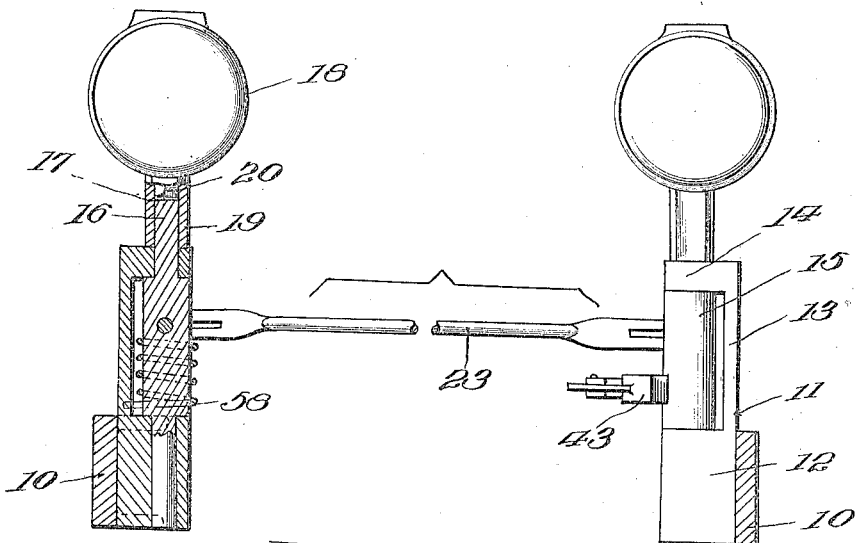
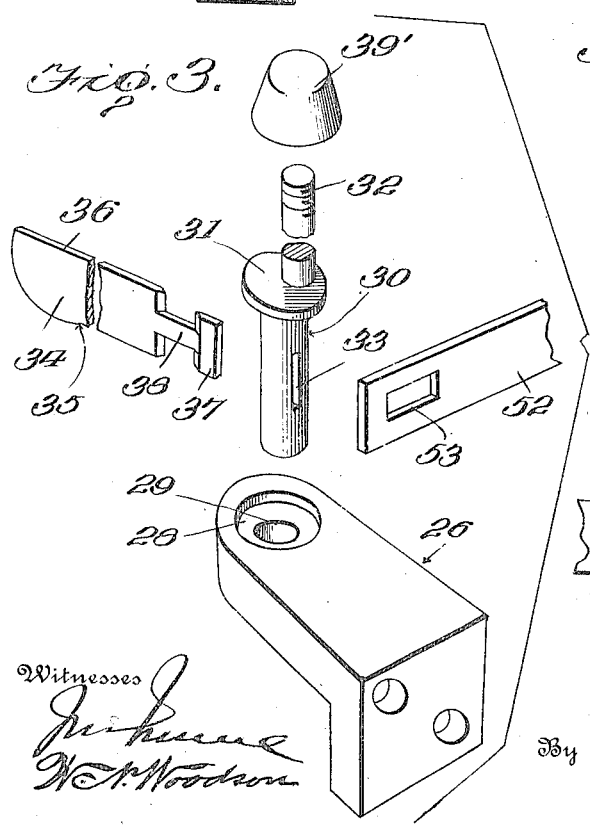
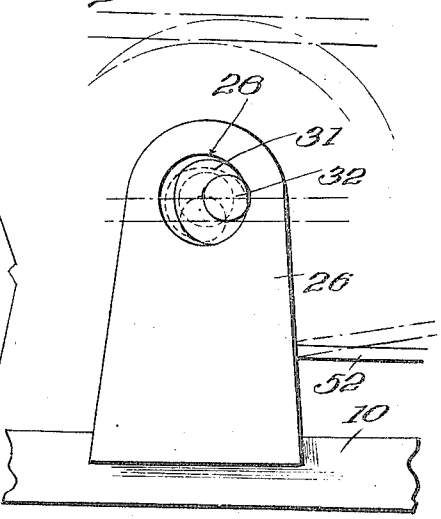
Inventor
T. R. Hanson

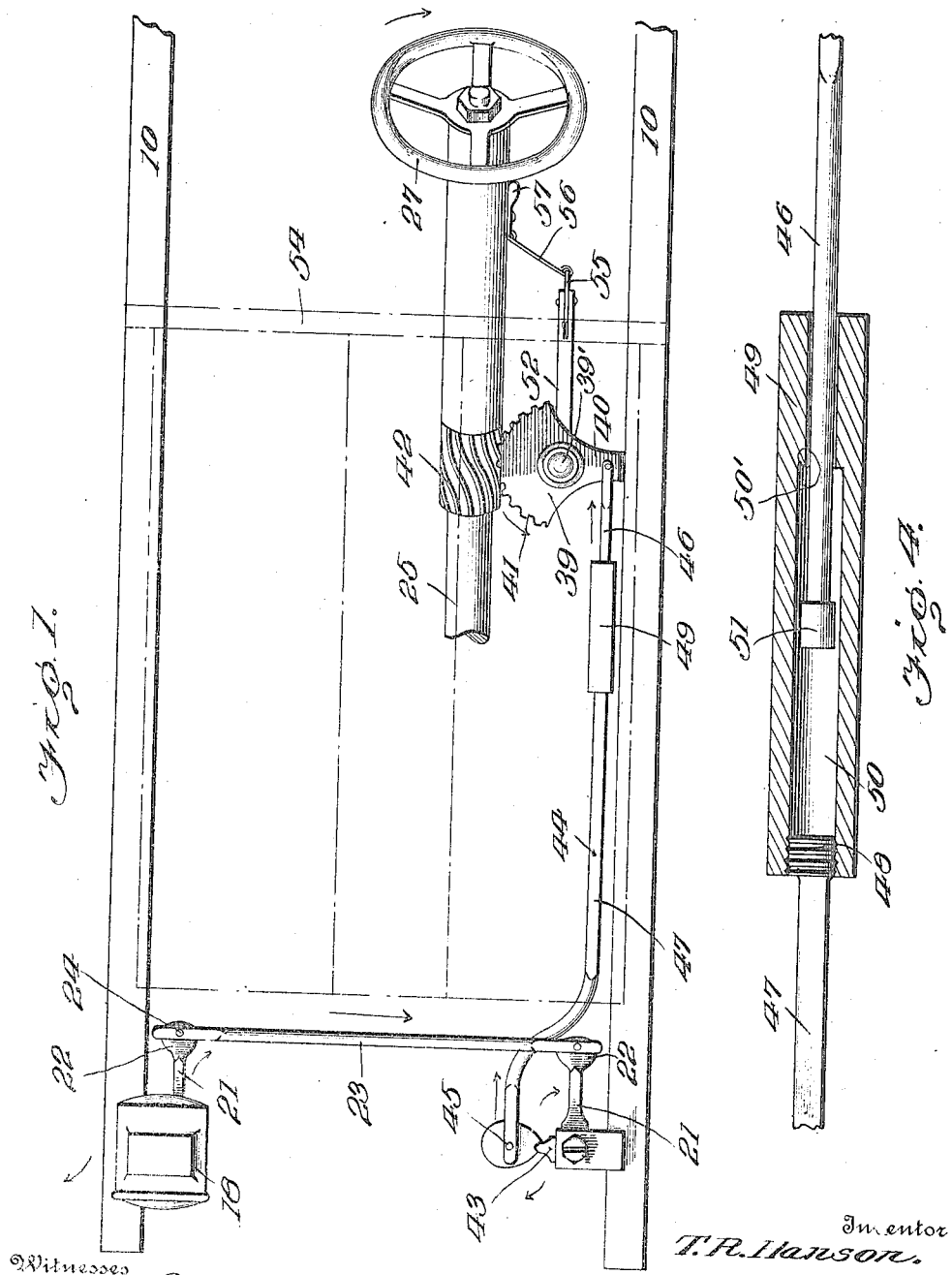

UNITED STATES PATENT OFFICE.

THOMAS R. HANSON, OF TUSCALOOSA, ALABAMA.

DIRIGIBLE HEADLIGHT.

1,158,207.   Specification of Letters Patent.   Patented Oct. 26, 1915.

Application filed January 4, 1915. Serial No. 459.

*To all whom it may concern:*

Be it known that I, THOMAS R. HANSON, a citizen of the United States, residing at Tuscaloosa, in the county of Tuscaloosa and State of Alabama, have invented certain new and useful Improvements in Dirigible Headlights, of which the following is a specification.

This invention relates to certain new and useful improvements in dirigible headlights for automobiles and has as its primary object to provide a construction wherein the headlights will be correspondingly moved with the front wheels of the vehicle as the automobile is guided so that the light from the lamps will be directed in the path of the machine when turning curves or rounding corners.

The invention has as a further object to provide an improved construction of this character wherein the mechanism employed may be operatively connected to or disconnected from the steering mechanism of the machine to which it is applied, when desired, to the end that in day time when the headlights are not in use, they may be allowed to remain in a stationary position and at night may then be operatively connected to the steering mechanism of the machine.

A still further object of the invention is to provide an efficient construction for shiftably connecting the headlight operating mechanism with the steering mechanism of the vehicle and wherein the headlight operating mechanism may be locked in either operative or inoperative position.

The invention has as a still further object to provide a construction employing a connection between the headlight operating mechanism and the steering mechanism of the vehicle of such character that any slight lateral movement of the front wheels of the vehicle in passing over rough roads, will not effect a corresponding movement of the headlights, and wherein the play of the steering wheel as ordinarily found in motor vehicles will be taken up, so that such play of the steering wheel will also not serve to effect a corresponding movement of the headlights. And a still further object of the invention is to provide a construction of the above described character wherein the headlights will be yieldably maintained in normal position.

Other and incidental objects will appear as the description proceeds and in the drawings wherein I have illustrated the preferred embodiment of my invention and wherein similar reference numerals designate corresponding parts throughout the several views, Figure 1 is a top plan view showing my improved mechanism applied to the frame of a motor vehicle, Fig. 2 is a front elevation partly in section disclosing the mounting of the headlights, Fig. 3 is a fragmentary perspective view showing the mounting of the cam shaft employed for shiftably connecting the headlight operating mechanism with the steering mechanism of the vehicle, this view showing the parts detached but in proper operative position, Fig. 4 is a fragmentary sectional view of the slidable connection between the sections of the operating rod of the mechanism, and Fig. 5 is a plan view more particularly illustrating the movement of the cam shaft within its seat.

For convenience, I have illustrated my improved mechanism applied in operative position to the frame of a motor vehicle having the conventional type of side members 10. Secured to the inner face of the side members adjacent the forward extremities thereof in advance of the hood of the machine shown in dotted lines in Fig. 1, are lamp supporting brackets 11. These brackets are arranged in transverse alinement and may be connected with the side members 10 in any suitable manner.

Upon particular reference to Fig. 2 of the drawings, it will be observed that the brackets 11 are arranged vertically upon the side members and each of said brackets includes a body portion 12 seating against the adjacent frame member and upon which is formed a vertically arranged extension 13 terminating, at its free extremity, in a laterally disposed arm 14. The arm 14 and body portion 12 are provided with vertically alined openings and journaled in said openings are the trunnions of a lamp receiving post 15, the intermediate portion of which is enlarged and fits between the arm 14 and the body portion 12.

The upper terminals 16 of the posts 15 project through the arms 14 to extend upon one side thereof and at their upper extremities are transversely notched as shown at 17. Lamps 18 of any suitable character are employed and are provided with sockets 19 fitting over the upper terminals 16 of the posts which sockets at their inner extremities are provided with transversely extending webs 20 engaging within the notches 17. It will be observed that the lamps 18 are operatively connected with the posts 15 to turn therewith while the said lamps may, if desired, be readily detached.

Extending laterally and rearwardly from the intermediate portions of the posts 15 in substantially parallel relation to each other are lever arms 21 which at their outer terminals are preferably flattened as shown at 22. A bar 23 joins the outer extremities of the arms 21, the said bar at its ends being bifurcated to receive the flattened portions 22 of the arms and being pivotally connected therewith by suitable pins 24.

Connected to one of the side members 10 within the hood of the machine as shown in Fig. 1 of the drawings and adjacent the steering post 25, is a bracket 26. In this connection, it should be stated that the steering post disclosed may be of any conventional type and is mounted in the ordinary manner, being operatively connected with the front wheels of the vehicle and being provided with a steering wheel 27.

The bracket 26 may be formed of any suitable material and adjacent one end thereof is bent laterally to provide a depending flange arranged to seat against the adjacent side member 10 to be secured thereto in any suitable manner.

It will be observed that the bracket 26 is arranged to extend from the adjacent member 10 inwardly toward the steering post 25 and adjacent the outer extremity thereof and upon its upper face, is recessed to provide a cam seat 28 communicating with which and extending through the bracket is a bore 29, it being observed that the bore 29 is of less diameter than the seat 28.

Journaled within the bore 29 and removably fitted therein is the lower extremity of a vertically arranged cam shaft indicated as a whole in Fig. 3 of the drawings at 30. Formed on the shaft 30 intermediate the ends thereof is a cam head 31 which engages within the seat 28 while the upper extremity 32 of the said shaft projects upwardly from the said head, it being observed that the upper terminal of the shaft is offset or eccentric to the lower extremity thereof. The cam head 31 is disposed to support the cam shaft 30 upon the bracket 26 with the upper face of the said head disposed in alinement with the upper face of the bracket while the lower extremity of the shaft projects beyond the opposite side thereof.

Formed in the lower extremity of the shaft is a diametrically arranged slot 33 which is disposed to detachably and slidably receive a wedge 34 having an inclined curved lower edge 35 and a preferably straight upper edge 36. Adjacent its smaller end, the wedge 34 is reduced to provide a vertically arranged head 37 which is connected with the body portion of the wedge by a shank 38.

The longitudinal dimension of the slot 33 is somewhat greater than the width of the wedge 34 at the smaller end thereof so that considerable longitudinal movement of the wedge within the slot will be permitted, it being noted, however, that the larger end of the wedge will bind within the slot to limit the movement of the wedge in one direction. Owing to the presence of the lower inclined edge 35 of the wedge, the said wedge will, as will be clear, also be moved upwardly within the slot simultaneous with its longitudinal movement therein as just set forth, causing the straight edge 36 to be moved upwardly in a vertical plane, while movement of the wedge 34 longitudinally within the slot 33 in the reverse direction, will cause the straight edge 36 to be correspondingly moved downwardly in a vertical plane. The purpose of this construction will presently appear.

Detachably fitting upon the extremity 32 of the cam shaft 30 is a segment 39 which, medially thereof, is provided with an opening to receive the shaft, which opening is surrounded by an upstanding sleeve as more particularly shown in Fig. 1. The segment 19 is arranged to seat upon the adjacent upper face of the cam head 31 to bear over the adjacent upper face of the bracket 26 and is connected with the upper terminal of the shaft, preferably by an internally screw threaded cap 39′, the said cap detachably engaging the threaded upper extremity of the portion 32 of the shaft and bearing against the adjacent end of the said sleeve. It will be observed that the arm 40 of the segment is disposed to extend laterally toward the adjacent side member 10 while the arcuate face thereof is provided with teeth 41 disposed to operatively engage a suitable worm gear 42 carried by the shaft 25. As will be clear, the worm gear 42 may be formed directly on the shaft 25 or may be formed on a sleeve keyed to the shaft, this modification in structure being entirely within the purview of the present invention.

One of the brackets 15 is provided with a laterally extending crank arm 43 and operatively connecting the said arm with the arm 40 of the segment 39 is a connecting lever 44, which at its extremities is preferably bifurcated to receive the said arms and is pivotally secured thereto by suitable pivot pins 45.

The connecting lever 44 is formed in sections 46 and 47, the section 47 adjacent the outer terminal thereof being recurved to be secured to the outer extremity of the crank arm 43 as more particularly shown in Fig. 1 of the drawings. As shown in this figure, the connecting lever 44 is arranged within the hood of the machine adjacent the contiguous member 10 where it will be out of the way of other mechanism arranged within the hood, it being understood that any suitable openings are provided to allow the forward extremity of the connecting lever to be connected with the crank arm 43.

The inner extremity of the section 47 of the connecting lever 44 is provided with a head 48, attention being now particularly directed to Fig. 4 of the drawings. Screw threaded upon this head or secured thereto in any suitable manner is a connecting sleeve 49 which medially thereof, is provided with a longitudinally extending bore 50, which is reduced adjacent one extremity of the sleeve to provide an internal annular shoulder 50', the head 48 fitting within the larger end of the bore. Slidably mounted within the bore 50 at the smaller end thereof is the inner extremity of the section 46 of the connecting lever which is provided terminally, with a substantially cylindrical head 51 disposed within the larger end of the bore to confront the shoulder 50'.

The sections 46 and 47 of the connecting lever 44 are thus slidably connected by the sleeve 49 and attention is now particularly directed to the advantages of this connection. From the preceding description, it will be readily understood that movement of the steering wheel 27 to rotate the post 25 will correspondingly rotate the worm 22 to actuate the segment 29, which through the medium of its arm 40 and the connecting lever 44, will actuate the crank arm 43. The crank arm 43 will in turn effect the turning of the posts within the brackets 11 to effect a corresponding turning movement of the lamps 18.

As will be well understood, the front wheels of a motor vehicle are often turned laterally from a straight path in passing over rough roads and under normal circumstances, considerable play or free movement of the steering wheel 27 is provided for, so that such movement of the front wheels will not effect a corresponding movement of the steering wheel. It will now be observed upon reference to Fig. 4 of the drawings that the head 51 of the section 46 of the connecting lever 44 is normally disposed free within the bore 50 of the sleeve 49, so that motion imparted to the segment 39 through the medium of the steering post 25 and resulting from the slight lateral turning movement of the forward wheels of the vehicle referred to, will be taken up within the said sleeve, so that under ordinary circumstances, such movement of the front wheels of the vehicle will not be communicated to the lamps 18. Thus, the possibility of slight and sudden variation in the direction of the rays of the lamps from the cause stated, will be reduced to a minimum.

In this connection, it is desired to bring attention to the fact that the latitude of free movement of the head 51 within the connecting sleeve 49 will be directly correlated to the free movement permitted in the steering wheel 27, so that when the said steering wheel has been turned to take up the slack motion thereof, in either direction, the head 51 will engage within the bore 50 of the said sleeve to consequently effect the turning movement of the lamps 18. The turning of the wheel 27 in one direction, it will be observed, will cause the head 51 to slide within the sleeve 49 to abut the head 48 of the section 44 and by engagement with the said head, will effect the actuation of the crank arm 43. The turning of the steering wheel 27 in the reverse direction, as will be readily understood, will cause the head 51 of the section 46 of the connecting lever 44 to engage the shoulder 50' and consequently effect a movement of the lamps 18, in a reverse direction.

Particular attention is now directed to the construction which I provide for shifting the segment 39 to a position where its teeth 41 will engage the teeth of the worm gear 42, to thus operatively connect the headlight steering mechanism with the steering mechanism of the vehicle and to shift the said segment to inoperative position, as well as the means provided for locking the segment in either of said positions.

The wedge 34 is inserted within the slot 33 as heretofore explained and detachably connected to the smaller end of the said wedge is an operating lever 52. The inner end of said lever is notched as shown at 53 to allow the head 37 to pass therethrough when brought into longitudinal relation to the notch, when the shank 38 will freely engage in said notch, it being observed that the shank 38 is of such length as to permit of considerable pivotal movement of the wedge 34 in a horizontal plane relative to the inner extremity of the lever 52.

The outer extremity of the lever 52 is arranged to extend through a suitable opening formed in the dash 54 conventionally illustrated in dotted lines in Fig. 1 of the drawings and is pivotally secured to one arm of a bell crank lever 55 to the opposite arm of which, is pivotally connected, a link 56. Pivotally mounted upon the steering post 25 adjacent the steering wheel 27 is a suitable lever 57 which is operatively connected by the link 56 with the bell crank lever 55. As will be readily understood, movement of the lever 57, will, through the medium of the link 56 and the bell crank lever 55, effect the longitudinal movement of the operating lever 52.

Assuming that the lever 52 is moved inwardly, it will be seen that the shank 38 carried by the wedge 34 will pivot within the opening 53, while at the same time, the inner extremity of the said wedge will be moved in an arcuate path to correspondingly rotate the cam shaft 30. The cam head 31 will be correspondingly rotated within its seat 38 while the upper extremity 32 of the shaft and carrying the segment 39 will be moved away from the worm gear 42 to disengage the teeth 41 of the segment from the teeth of the said worm gear. Attention is now directed to the manner in which the said segment is locked in such inoperative position. The inward movement of the operating lever 52 referred to and causing the consequent pivotal movement of the wedge 34 relative to the lever will bring the wedge 34 to a position at an acute angle to the lever whereupon further inward movement of the operating lever 52 will tend to move the wedge 34 longitudinally within the slot 33 causing the lower inclined edge 35 thereof to ride over the lower edge of the said opening whereby the wedge will be moved upwardly within the said opening 33 to cause the upper straight edge 36 thereof to engage the lower flat face of the bracket 26, binding the cam head 31 within the seat 28 and thus not only preventing further inward movement of the operating lever 52, but also effecting a locking of the cam shaft.

In this connection, attention is further called to the formation of the cam seat 28, the wall of the said seat being so formed as to engage the cam head 31 upon one side thereof at the same time that the wedge 34 is moved into binding engagement with the lower face of the bracket 36. By this arrangement, the cam shaft 30 is further rigidly maintained in operative position.

Assuming that the operating lever 52 is moved outwardly through the opening formed in the dash 54, the cam shaft 30 will be rotated in a direction opposite to that just previously described and the segment 39 will be correspondingly moved to engage by its teeth 41 with the teeth of the worm gear 42. Such movement of the shaft 30 will cause the wedge 34 to pivot upon the operating lever 52 to a position beyond an obtuse angle thereto when a further outward movement of the lever 52 will tend to move the wedge 34 longitudinally within the opening 33 and into binding engagement against the lower face of the bracket 26, to consequently effectually maintain the cam shaft 30 stationary, with the segment 39 locked in operative position. The walls of the seat 28 are further so formed that when the wedge 34 thus engages the lower face of the bracket 26, the cam head 31 will engage within the said seat at a point opposite to its point of engagement when the segment 39 is moved to inoperative position as previously described. Thus, the segment as well as the cam shaft 30 will be rigidly held both in the operative and inoperative position of the segment. The purpose of providing this mechanism whereby the segment 39 may be shifted to operative and inoperative positions, will be clear, since during the daytime, when it is not desired to use the lamps 18, the segment may be moved to inoperative position to disengage the headlight operating mechanism from the steering mechanism of the vehicle, while at night, the segment 39 may be moved to operative position so that the lamps will be guided as the automobile is guided.

Surrounding the intermediate portion of one of the posts 15 of the lamp brackets 11, is a preferably helical spring 58 having one terminal thereof secured to the post while its opposite terminal is secured to the extensions 13, the said spring fitting between the body portion 12 of the bracket and the arm 21 thereof. This spring 58 is disposed to yieldably maintain the lamps in normal position, as will be readily understood, so that when the said lamps are disconnected from the steering mechanism of the vehicle, they will be directed substantially parallel with the vehicle. Preferably, the spring 58 is detachably connected with the post of the lamp bracket so that in the event of breakage, it may be readily removed.

Having thus described my invention, what I claim and desire to secure by Letters Patent is:—

1. A headlight operating mechanism adapted to be operatively connected to the steering mechanism of a vehicle and including a freely mounted lamp receiving post, means operatively engaging the steering post, and a lever connecting the said means with said lamp receiving post, said lever being formed in sections, and a sleeve carried by one of said sections and slidably receiving the adjacent terminal of the other section.

2. A headlight operating mechanism adapted to be operatively connected to the steering mechanism of a vehicle and including a freely mounted lamp receiving post, means operatively engaging the steering post, and a lever operatively connecting the said means with said lamp receiving post, said lever being formed in sections, a sleeve supported terminally of one of said sections and slidably receiving the adjacent terminal of the other section, said sleeve having an internal shoulder formed thereon, and a head formed on the adjacent terminal of said last mentioned section and disposed to selectively engage the adjacent terminal of the other section and said shoulder.

3. A headlight operating mechanism adapted to be operatively connected to the steering mechanism of a vehicle and including a rotatably mounted lamp receiving post, means operatively engaging the steering post, and a lever operatively connecting the said means with said lamp receiving post, said lever being formed in sections, and a sleeve carried by one of said sections disposed for engagement with the other section, said last mentioned section being freely connected with the sleeve.

4. A headlight operating mechanism adapted to be operatively connected to the steering mechanism of a vehicle and including a freely mounted lamp receiving post, means mounted adjacent the steering post and shiftable to operatively engage said post, means connecting the said first mentioned means with the lamp receiving post, and means for shifting said first mentioned means to engage the steering post.

5. A headlight operating mechanism adapted to be operatively connected with the steering mechanism of a vehicle and including a freely mounted lamp receiving post, means mounted eccentric to the steering post and shiftable to operatively engage the said steering post, means operatively connecting said means and the lamp receiving post, and means for shifting said first mentioned means.

6. A headlight operating mechanism adapted to be operatively connected to the steering mechanism of a vehicle and including a freely mounted lamp receiving post, a shaft journaled adjacent the steering post, a portion of said shaft being offset, means carried by the offset portion of said shaft and adapted to operatively engage the steering post, means operatively connecting said first mentioned means with the lamp receiving post, and means for rotating said shaft, whereby said first mentioned means will be moved to engage the steering post.

7. A headlight operating mechanism adapted to be operatively connected to the steering mechanism of a vehicle and including a freely mounted lamp receiving post, a shaft journaled adjacent the steering post, means carried by said shaft and shiftable thereon to operatively engage the steering post, means operatively connecting said first mentioned means with the lamp receiving post, and means slidably connected with said shaft for shifting said first mentioned means.

8. A headlight operating mechanism adapted to be operatively connected to the steering mechanism of a vehicle and including a freely mounted lamp receiving post, a support arranged adjacent the steering post, a shaft journaled in said support, means carried by said shaft and shiftable means carried by said shaft and shiftable to operatively engage the steering post, means operatively connecting said first mentioned means with the lamp receiving post, and means slidably connected with said shaft for shifting said first mentioned means, said last mentioned means being movable upon the shaft into binding engagement with said support.

9. A headlight operating mechanism adapted to be operatively connected to the steering mechanism of a vehicle and including a freely mounted lamp receiving post, a support arranged adjacent the steering post, a shaft journaled in said support, means mounted upon said shaft and shiftable thereon to operatively engage the steering post, means operatively connecting said first mentioned means with the lamp receiving post, and means operatively engaging the shaft for shifting said first mentioned means, said last mentioned means being longitudinally slidable upon the shaft into frictional engagement with said support.

10. A headlight operating mechanism adapted to be operatively connected to the steering mechanism of a vehicle and including a freely mounted lamp receiving post, a support arranged adjacent the steering post, a shaft journaled in said support, means carried by said shaft and shiftable thereon to operatively engage the steering post, means operatively connecting said first mentioned means with the lamp receiving post, a wedge slidably connected with said shaft and movable thereon to engage the support, and means engaging said wedge whereby said first mentioned means may be shifted.

11. A headlight operating mechanism adapted to be operatively connected to the steering mechanism of a vehicle and including a freely mounted lamp receiving post, a support arranged adjacent the steering post, a shaft journaled in said support, means carried by the shaft and shiftable thereon to operatively engage the steering post, means operatively connecting said first mentioned means with the lamp receiving post, and means shiftable upon said shaft to frictionally engage the support simultaneously with the engagement of said first mentioned means with the steering post.

12. A headlight operating mechanism adapted to be operatively connected to the stering mechanism of a vehicle and including a freely mounted lamp receiving post, a support arranged adjacent the steering post, a shaft journaled in said support, means mounted upon said shaft and shiftable thereon to operatively engage the steering post, means operatively connecting said first mentioned means with the lamp receiving post, said shaft having a slot formed therein, a wedge longitudinally movable in said slot to engage the support, and means freely connected with said wedge whereby the said first mentioned means may be shifted to engage the steering post.

13. A headlight operating mechanism adapted to be operatively connected to the steering mechanism of a vehicle and including a freely mounted lamp receiving post, a support arranged adjacent the steering post, a shaft journaled in said support, means mounted upon said shaft and shiftable thereon to operatively engage the steering post, means operatively connecting said first mentioned means with the lamp receiving post, said shaft having a slot formed therein, a wedge longitudinally slidable in said slot to engage the support, said wedge being formed with a reduced head having a shank, and an operating lever freely connected with said shank and engaged by said head, whereby the said first mentioned means may be shifted to engage the steering post.

14. A headlight operating mechanism adapted to be operatively connected to the steering mechanism of a vehicle and including a freely mounted lamp receiving post, a shaft journaled adjacent the steering post, means detachably mounted upon said shaft and shifting thereon to operatively engage the steering post, means operatively connecting said first mentioned means with the shaft and detachably engaging the shaft, means operatively connecting said first mentioned means with the lamp receiving post, and means operatively engaging the shaft whereby said first mentioned means may be shifted to engage the steering post.

15. A headlight operating mechanism adapted to be operatively connected to the steering mechanism of a vehicle and including a freely mounted lamp receiving post, a support arranged adjacent the steering post, said support having a cam seat formed therein, a shaft journaled in said support and provided with a cam disposed in said seat, means carried by the shaft and shiftable thereon to operative position to engage the steering post and to inoperative position, said cam being arranged to engage in said seat in each of said positions, means operatively connecting said first mentioned means with the lamp receiving post, and means engaging the shaft whereby said first mentioned means may be shifted.

16. A headlight operating mechanism adapted to be operatively connected to the steering mechanism of a vehicle and including a freely mounted lamp receiving post, a support arranged adjacent the steering post, said support having a cam seat formed therein, a shaft journaled in said bracket and provided with a cam intermediate the ends thereof disposed in said seat, one terminal of the shaft being offset, means carried by said terminal of the shaft and shiftable thereon to operatively engage the steering post and to inoperative position, the cam being disposed to engage in said seat in each of said positions, means operatively connecting said first mentioned means with the lamp receiving post, and means engaging the shaft whereby the said first mentioned means may be shifted.

17. A headlight operating mechanism adapted to be operatively connected to the steering mechanism of a vehicle and including a freely mounted lamp receiving post, a support arranged adjacent the steering post, said support being formed with a cam seat, a shaft journaled in said support and provided with a cam disposed in said seat, means carried by the shaft and shiftable thereon to operative position to engage the steering post and to inoperative position, means operatively connecting said first mentioned means with the lamp receiving post, the cam being disposed to engage in said seat in each of said positions, and means engaging the shaft whereby the said first mentioned means may be shifted, the said last mentioned means being shiftable upon the shaft to engage the support in each of the positions of the said first mentioned means simultaneously with the engagement of the cam within its seat.

18. A headlight operating mechanism adapted to be operatively connected to the steering mechanism of a vehicle and including a freely mounted lamp receiving post, a worm gear carried by the steering post, a segment shiftable to operatively engage said worm gear, means connecting said segment and said lamp receiving post, and means for shifting the segment.

19. A headlight operating mechanism adapted to be operatively connected to the steering mechanism of a vehicle and including a freely mounted lamp receiving post, means mounted adjacent the steering post and shiftable to operatively engage said post, means connecting the lamp receiving post with said first mentioned means, and a cam for locking the said first mentioned means in engagement with the steering post.

20. A headlight operating mechanism adapted to be operatively connected to the steering mechanism of a vehicle and including a freely mounted lamp receiving post, means mounted adjacent the steering post and shiftable to operatively engage said post, means connecting the lamp receiving post with said first mentioned means, and shiftably mounted means movable to locked position by a wedge for holding said first mentioned means in engagement with the post.

21. A headlight operating mechanism adapted to be operatively connected to the steering mechanism of a vehicle and including a freely mounted lamp receiving post, means mounted adjacent the steering post and shiftable to operatively engage said post, means connecting the lamp receiving post with said first mentioned means, a cam for locking the said first mentioned means in engagement with the post, and shiftably mounted means movable into wedged locked position to coöperate with the cam.

In testimony whereof I affix my signature in presence of two witnesses.

THOMAS R. HANSON. [L. S.]

Witnesses:
S. D. McGee,
J. L. Hunnicutt.